(12) United States Patent
Larringan Errasti et al.

(10) Patent No.: US 8,668,208 B2
(45) Date of Patent: Mar. 11, 2014

(54) PALLET TRUCK FOR TRANSPORTING GOODS

(75) Inventors: Igor Larringan Errasti, Onati (ES);
Aitor Telleria Echeverria, Onati (ES);
Benito Hurtado Mena, Onati (ES);
Jone Larranaga Mendibaso, Onati (ES); Fernando Odriozola Arregui, Onati (ES)

(73) Assignee: Ulma Safe Handling Equipment, Onati (ES)

( * ) Notice: Subject to any disclaimer, the term of this patent is extended or adjusted under 35 U.S.C. 154(b) by 0 days.

(21) Appl. No.: 13/245,693

(22) Filed: Sep. 26, 2011

(65) Prior Publication Data

US 2012/0080858 A1    Apr. 5, 2012

(30) Foreign Application Priority Data

Sep. 30, 2010 (EP) .................................... 10382261

(51) Int. Cl.
*B66F 9/06*    (2006.01)

(52) U.S. Cl.
USPC .............. 280/43.12; 280/43.17; 280/43.23; 280/638; 280/43; 414/495; 414/680; 414/685

(58) Field of Classification Search
USPC ............... 280/43.12, 43, 43.17, 43.23, 638; 414/685, 495
See application file for complete search history.

(56) References Cited

U.S. PATENT DOCUMENTS

| | | | |
|---|---|---|---|
| 2,358,957 A * | 9/1944 | Barrett .......................... | 254/10 C |
| 2,372,585 A | 3/1945 | Klumb | |
| 3,072,418 A * | 1/1963 | Becker ....................... | 280/43.12 |
| 3,140,786 A * | 7/1964 | Clatterbuck .................. | 414/733 |
| 3,758,075 A | 9/1973 | Briggs | |
| 4,969,794 A | 11/1990 | Larsen | |
| 5,275,473 A * | 1/1994 | Hicks .......................... | 301/105.1 |
| 7,296,806 B2 * | 11/2007 | Borrmann ................... | 280/43.12 |
| 2003/0080544 A1 | 5/2003 | Rosenkranz | |
| 2004/0076499 A1 * | 4/2004 | Gramatikov .................. | 414/495 |
| 2005/0116432 A1 | 6/2005 | Borrmann | |

FOREIGN PATENT DOCUMENTS

FR    2815007 A1    4/2002

OTHER PUBLICATIONS

KMSbearingsinc.com "Ten Good Reasons to Use Plastic Ball Bearings" brochure created Mar. 7, 2008—from PDF properties.*
European Search Report on European Patent Application No. EP 10382261; Jan. 19, 2011; 1 Page; European Patent Office, Munich.
Annex to the European Search Report on European Patent Application No. EP 10382261; Jan. 19, 2011; 3 Pages; European Patent Office, Munich.

* cited by examiner

*Primary Examiner* — J. Allen Shriver, II
*Assistant Examiner* — Steve Clemmons
(74) *Attorney, Agent, or Firm* — Tim L. Kitchen; Peter B. Scull; Hamilton, DeSanctis & Cha, LLP (57) ABSTRACT

Pallet truck for transporting goods that has a substantially horizontal frame on which the goods to be transported are placed. In one implementation the horizontal frame includes two substantially parallel arms with each arm having two parallel longitudinal extensions that define a space between them. Each of the two parallel longitudinal extensions has a wall that face each other and which are visible and accessible through the space. The longitudinal extensions being visible and accessible from above for their cleaning.

18 Claims, 6 Drawing Sheets

PALLET TRUCK FOR TRANSPORTING GOODS

CROSS-REFERENCE TO RELATED APPLICATIONS

This application is related to and claims the benefit and priority to European Patent Application No. EP10382261, filed Sep. 30, 2010.

TECHNICAL FIELD

This invention relates to pallet trucks for transporting goods, and in particular to pallet trucks for transporting goods to be used in clean environments and spaces, such as clean rooms, food production rooms and laboratories in the chemical sector.

BACKGROUND

Clean environments or spaces, such as clean rooms, food production rooms or laboratories in the chemical sector, are spaces in which materials and/or objects and goods that are sensitive to contaminants and other substances associated with dirt, such as pharmaceutical or food products, are handled. These types of products are generated from a raw material that is introduced into or removed from clean spaces and/or handled in the clean spaces by means of handling apparatuses such as high-lifting pallet trucks.

Pallet trucks comprise a frame that generally comprises two parallel longitudinal arms, and there are known pallet trucks in which the frames are lifted mechanically (manual mode), and in which the frames are lifted electrically by means of motors (automatic mode). In both cases contaminating substances may adhere to the pallet truck, and/or the pallet truck itself may generate contaminating substances that adhere to its elements, which may be harmful for the clean room and/or for the goods handled.

U.S. Publication US2003/0080544A discloses a solution to the aforementioned drawbacks. The application discloses a pallet truck that is covered with at least one protective covering, and the covering may correspond with a single unit, the entire covering being capable of being replaced by a new one when it is deemed that said covering contains dirt and/or contaminants that may be harmful, or it may correspond with a plurality of units that are joined together to cover different elements of the pallet truck, so that when it is deemed that part of said covering contains dirt and/or contaminants it is not necessary to replace the entire covering, it being sufficient to replace said element only.

SUMMARY OF THE DISCLOSURE

It is an object of this invention to provide a pallet truck for transporting goods adapted for its use in clean environments and spaces, such as a clean room.

The pallet truck of the invention is used to transport and/or handle goods. Said pallet truck comprises a frame on which are disposed the goods to be transported and which comprises two substantially parallel and longitudinal arms.

Each arm comprises two parallel longitudinal extensions that define a space between them, comprising two walls that face each other and which are visible and accessible through said space, said longitudinal extensions being visible and accessible from above for cleaning.

As a result the arms may be cleaned from the outside in a simple manner and without the risk of leaving areas uncleaned. In addition, as all the areas are visible and accessible from above, the risk of dirt accumulating in areas that are difficult to access or in areas that cannot be inspected visually is reduced, largely preventing areas from remaining unclean. With the pallet truck of the invention it is not necessary for additional elements to be disposed, such as canvases or coverings, to cover the frame and prevent it from becoming dirty, and which would then have to be replaced by new ones when they become dirty.

These and other advantages and characteristics of the invention will be made evident in the light of the drawings and the detailed description thereof.

DETAILED DESCRIPTION

The figures show different embodiments of the pallet truck 100 for transporting and/or handling goods of the invention. In a first embodiment, shown in FIGS. 1 to 6, the pallet truck 100 corresponds with a manual conventional pallet truck. In a second embodiment, shown in FIG. 7, the pallet truck 100 corresponds with a manual scissor-type pallet truck. In a third embodiment, shown in FIGS. 8 and 9, the pallet truck 100 corresponds with an electric pallet truck.

The pallet truck 100, in any of its embodiments, comprises a substantially horizontal frame 1 on which the goods to be transported and/or handled are placed, and which comprises two substantially parallel and longitudinal arms 10 and 11, articulation means connected to the frame 1 and adapted to cause a lifting of said frame 1 from a rest position Pr to an active position Pa, and action means by means of which a movement of the pallet truck 100 and the lifting of the frame 1 are caused. The action means comprise at least one control wheel 40 that runs along a surface when the pallet truck 100 moves and which is facing one end of the frame 1, and the pallet truck 100 comprises at least one wheel 6 disposed approximately on one end of each arm 10 and 11, opposite to the end to which the control wheel 40 is facing, which allows the movement of said pallet truck 100 along with the control wheel 40. Preferably the control wheel 40 is bigger than the wheel 6, and the pallet truck 100 can comprise two or more control wheels 40 and wheels 6.

Figure 1:
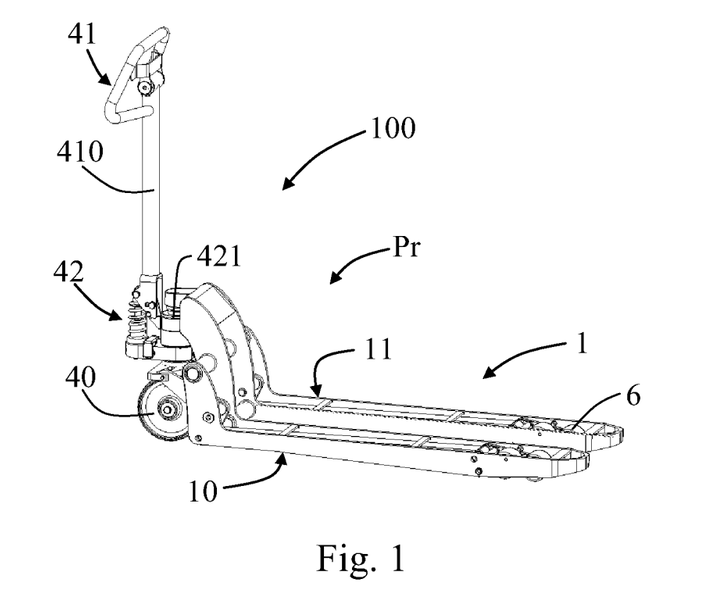
FIG. 1 shows a view in perspective of a first embodiment of the pallet truck of the invention, with a frame of said pallet truck in a rest position.
Figure 2:
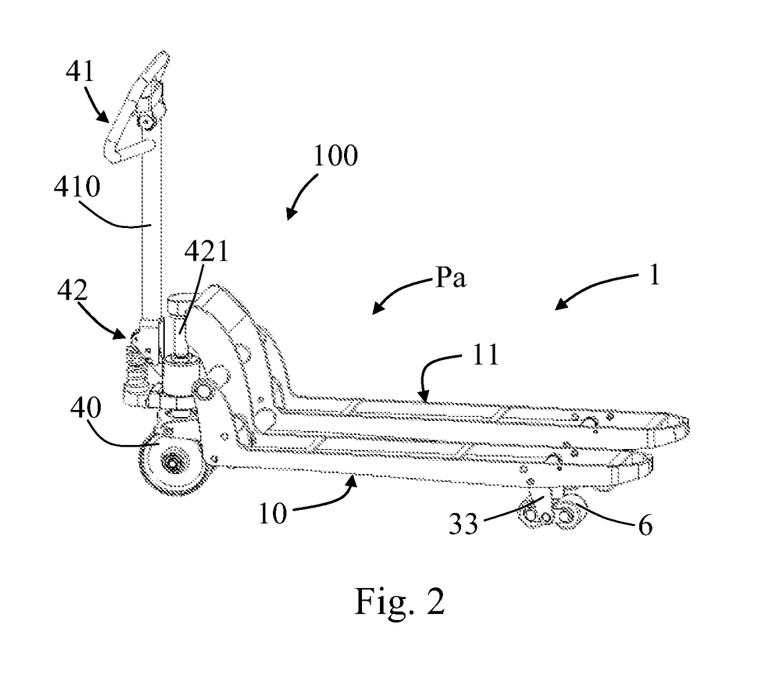
FIG. 2 shows a view in perspective of the first embodiment of the pallet truck of the invention, with the frame of said pallet truck in an active position.
Figure 3:
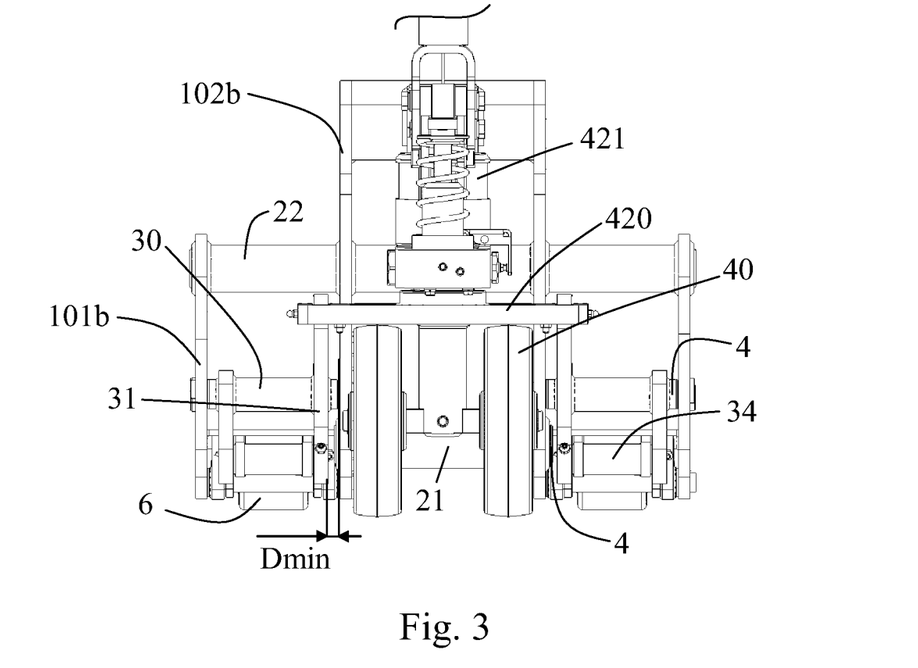
FIG. 3 shows a partial rear view of the pallet truck of FIG. 1.

The action means also comprise a control pad 41 on which a user can act to cause the movement of said pallet truck 100 and/or the lifting of the frame 1, and transmission means 42 to transmit to the control wheel 40 the movement of the pallet truck 100 and to the articulation means the passage of the frame 1 from the rest position Pr to the active position Pa and vice versa, caused by the user on the control pad 41. In the first embodiment and the second embodiment, the transmission means 42 is disposed on the control wheel 40, and comprises a base 420 to which said control wheel 40 is joined with freedom of movement, the frame 1 also being connected to said base 420, as shown in FIG. 3 for example. In said two embodiments, said transmission means 42 also comprises a hydraulic cylinder 421 or an equivalent means for causing the lifting of said frame 1, which are fixed on said base 420. Said transmission means 42 and its arrangement are not the object of the invention, as a result of which its operation and arrangement are not explained, these being conventional. In the third embodiment, the transmission means 42 comprise electrical action means M, for example a motor, instead of a hydraulic cylinder 421, which is preferably disposed on the wheel 40, as it will be explained below.

The two arms 10 and 11 are analogous, as a result of which only one of them is explained, it being evident that both the explanation and the terminology apply to the other arm 11.

Figure 4:
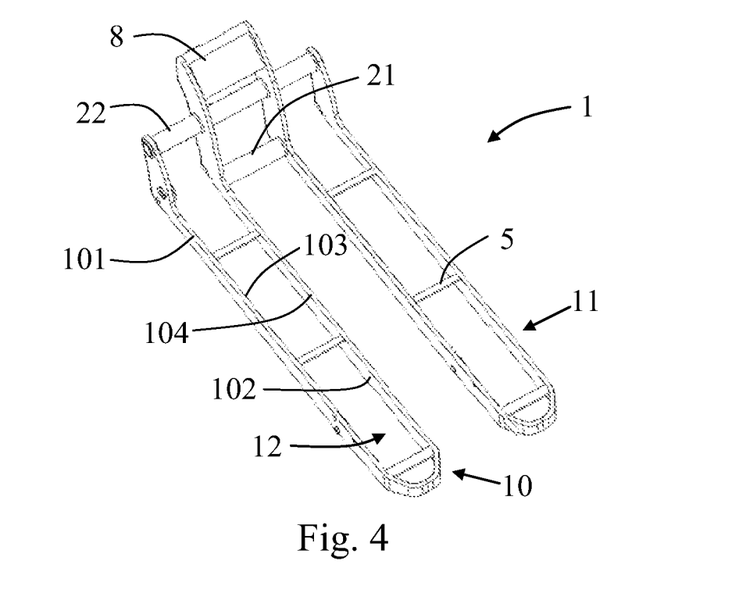
FIG. 4 shows a view in perspective of a frame of the pallet truck of FIG. 1.

With reference to FIG. 4, for example, the arm 10 comprises two longitudinal extensions 101 and 102 that define a space 12 between them, comprising two walls 103 and 104 that face each other through said space 12, which are visible and accessible from above for their cleaning through said space 12, said longitudinal extensions 101 and 102 thus being visible and accessible from above for their cleaning, and preferably comprising a substantially rectangular section. The arms 10 and 11 can thus be cleaned from above in a simple manner, reducing to a great extent the risk of leaving areas uncleaned. In addition, as the longitudinal extensions 101 and 102 are visible and accessible from above, there is a reduced risk of dirt accumulating in areas of said longitudinal extensions 101 and 102, and, therefore, said frame 1, which is difficult to access, or in areas that cannot be inspected visually, preventing to a large extent areas from being left uncleaned. With the pallet truck 100 of the invention it is not necessary to dispose additional elements, such as canvases or coverings, to cover the frame 1 and prevent it from becoming dirty, which would then have to be replaced by new ones when they become dirty and/or contaminated.

The arm 10 preferably comprises a curved section on one of its ends, opposite to the one facing the control wheel 40. The longitudinal extensions 101 and 102 can thus be two different elements that are connected at the curved end by means of continuous welding for example, or may be constituted by a single element (a plate for example), which is bent until it takes a substantially U-shaped form, each extension of the U corresponding with one of the longitudinal extensions 101 and 102. Said longitudinal extensions 101 and 102 are substantially rectangular.

Preferably, the arm 10 comprises a plurality of sheets 5, which are preferably transversal, which connect the two corresponding longitudinal extensions 101 and 102 to each other and thus provide greater rigidity to the arm 10. Said transverse sheets 5 are also visible and accessible from the outside, so that they can be cleaned easily and effectively without the need to turn the pallet truck 100 around, for example.

The wheel 6 is disposed approximately on one end of the arm 10, connected on each side to a longitudinal extension 101 and 102 of said arm 10 with freedom of rotation, said wheel 6 being disposed in the space 12 defined by the two longitudinal extensions 101 and 102 of the corresponding arm 10 and 11 when the pallet truck 100 is in the rest position Pr. The articulation means are attached to the wheel 6 and are visible and accessible from above for their cleaning, so that when the frame 1 moves to the active position Pa, said wheel 6 remains in its position in contact with the surface along which it runs when the pallet truck 100 moves, said pallet truck 100 being capable of moving if required. Additionally, when, with the frame 1 in the rest position Pr, the pallet truck 100 moves, thanks to the space 12, the noise caused by the rubbing of the wheels 6 against the floor when they move spreads through said open space 12 without surrounding any structure or zone of the frame 1, which acts as a sounding box, as a result of which the pallet truck 100 of the invention generates less noise than the pallet trucks 100 known in the prior art. Similarly, the noise caused by the banging and vibrations transmitted to the frame 1 by the wheels 6 when they move on the floor is also absorbed by polymer bearings 4 comprised in the pallet truck 100.

Figure 5:
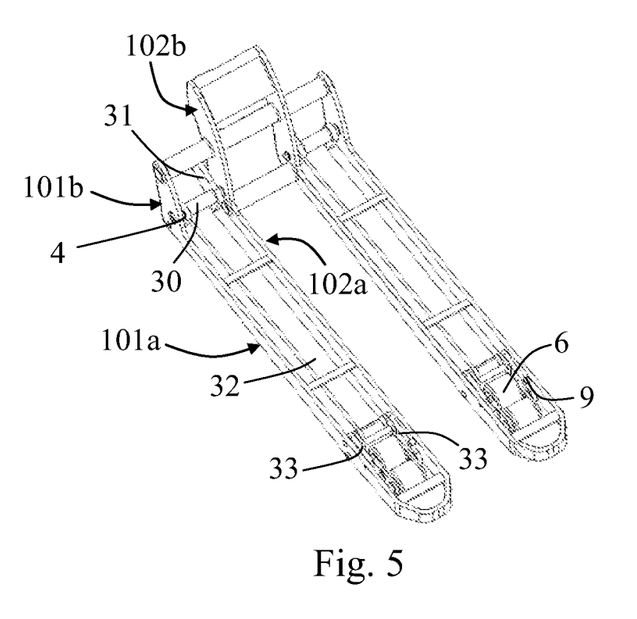
FIG. 5 shows articulation means of the pallet truck of FIG. 1.
Figure 6:
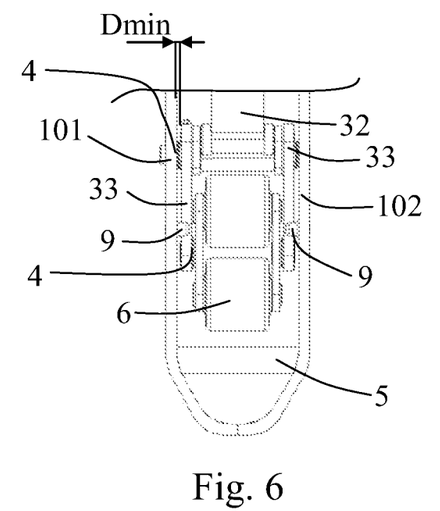
FIG. 6 shows, in detail, one end of an arm of the pallet truck of FIG. 1.

The articulation means, shown for example in FIG. 5, comprise, for each arm 10 and 11, a transverse support shaft 30 that is visible and accessible from above for its cleaning and which is disposed between the two longitudinal extensions 101 and 102 of the arm 10, connected at its ends to said longitudinal extensions 101 and 102, and a lever 31 that is connected to said support shaft 30 and to the base 420 of the action means and which rotates in relation to said base 420 when the frame 1 is lifted up. The lever 31 is visible and accessible from above for its cleaning, and is disposed at at least one preset minimum distance Dmin in relation to the closest longitudinal extension 101 and 102. Preferably the lever 31 is connected to the support shaft 30 in the proximities of one end of said support shaft 30, close to a longitudinal extension 101 and 102 but always maintaining at least the preset minimum distance Dmin in relation to said longitudinal extension 101 and 102, which is approximately 6 millimeters. This thus ensures a minimum space of approximately 6 millimeters between two elements (lever 31 and longitudinal extension 101 and 102, in this case), thereby restricting the accumulation of dirt between said two elements, and thus making it easier to clean the frame 1 of the pallet truck 100. Some of the polymer bearings 4, which dampen the noise of the pallet truck 100, are also used as spacers to achieve the minimum distance Dmin.

The articulation means also comprise, for each arm 10 and 11, an additional transverse support shaft 34 that is visible and accessible for its cleaning and which is disposed between the two longitudinal extensions 101 and 102 of the arm 10, connected at both ends to said longitudinal extensions 101 and 102, a longitudinal sheet 32 that extends between the two longitudinal extensions 101 and 102 from said additional support shaft 34 and which is connected to the wheel 6, and a rotating plate 33 on each side of the wheel 6, which is connected with freedom of rotation at one end to said longitudinal sheet 32 and at the other end to said wheel 6, said longitudinal sheet 32 thus being connected to said wheel 6. Each rotating plate 33 is disposed at at least the preset minimum distance Dmin in relation to the closest longitudinal extension 101 and 102, as shown, for example, in FIG. 6, each side of said longitudinal sheet 32 being separated from the closest longitudinal extension 101 and 102 also by at least said minimum distance Dmin, which is approximately 6 millimeters. This thus ensures a minimum space of 6 millimeters between two elements (rotating plate 33 and longitudinal extension 101 and 102; and longitudinal sheet 32 and longitudinal extension 101 and 102, in this case), thereby restricting the accumulation of dirt between said two elements, thus making it easier to clean the frame 1 of the pallet truck 100. Both the rotating plates 33 and the longitudinal sheet 32 are visible and accessible from above for their cleaning, thanks to the space 12 defined between the longitudinal extensions 101 and 102, thereby making them easier to clean. Some of the polymer bearings 4, which dampen the noise of the pallet truck 100, are also used as spacers to achieve the minimum distance Dmin.

The support shaft 30 and the additional support shaft 34 are substantially cylindrical, and are connected to the corresponding longitudinal extensions 101 and 102 by means of continuous welding. Preferably said shafts 30 and 34 also pass through the longitudinal extension 101 and 102 to which they are connected, being connected by both faces to said longitudinal extension 101 and 102. As a result, by means of said continuous welding, the generation of unevenness on the surface of the welding is eliminated or reduced to a large extent, thereby eliminating or reducing to a large extent the risk of dirt accumulating on said welding, thus making it easier to clean the frame 1 of the pallet truck 100.

When the movement of the frame 1 to the active position Pa is caused, the hydraulic cylinder 421 (or the electrical action means M) of the transmission means 42 cause the longitudinal extensions 101 and 102 to be lifted up. The lever 31 thus rotates in relation to the base 420, thereby causing the lifting of the longitudinal sheet 32, which in turn causes the rotating plate 33 to rotate in relation to the end connected to the wheel 6. Both the frame 1 and said longitudinal sheet 32 are thus lifted up, while said wheel 6 remains in contact with the floor or with the surface along which it runs when the pallet truck 100 moves.

Figure 7:
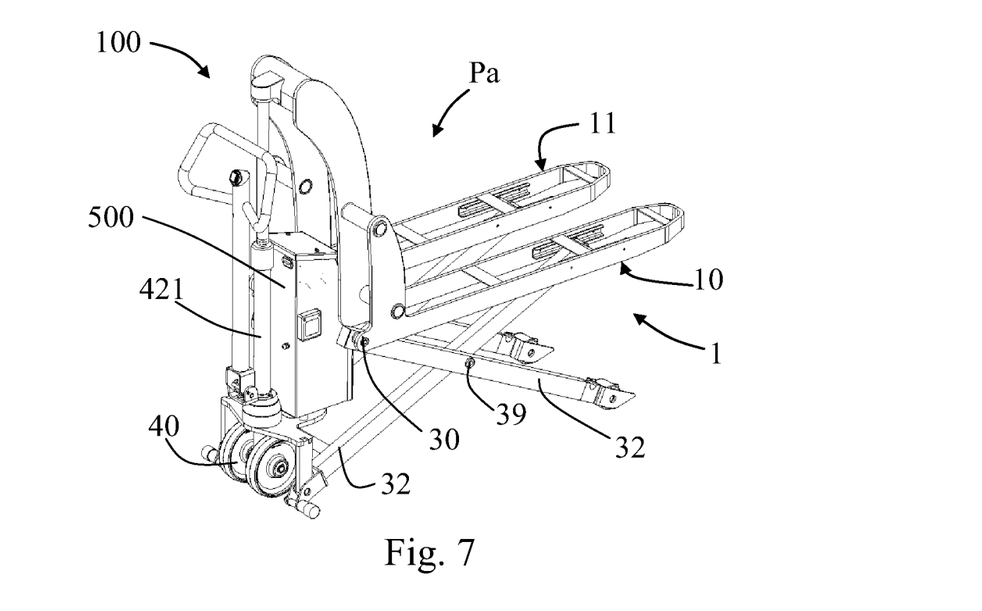
FIG. 7 shows a view in perspective of a second embodiment of the pallet truck of the invention, with a frame of said pallet truck in an active position.

In the second embodiment of the pallet truck 100 of the invention the articulation means operates differently, as can be deduced from FIG. 7, although its operations are not detailed as they are known in the prior art. Instead of a longitudinal sheet 32, in said second embodiment of the pallet truck 100 the articulation means comprise two longitudinal sheets 32 which are lifted in the manner of scissors (hence the name) in relation to a common shaft 39, when the hydraulic cylinder 421 of the transmission means 42 causes the longitudinal extensions 101 and 102 to be lifted. One of the longitudinal sheets 32 is connected at one end to the wheel 6 and at the other end to the corresponding arm 10 and 11, while the other longitudinal sheet 32 is connected at one end to the base 420 and at the other end to the corresponding arm 10 and 11. In said second embodiment shown in FIG. 7, a sealed compartment is also shown and in which electrical means (motor, battery, etc) are housed to control the pallet truck 100 remotely by means of radio-frequency for example, which is usually advantageous in improving efficiency as it reduces the movements of the operator between the loading/unloading position and the control pad 41. Said sealed compartment is covered by a cover 500 that is accessible from the outside, said cover 500 being capable of being cleaned easily. As it is sealed, no dirt and/or corrosive or contaminating materials may be introduced into said sealed compartment.

The pallet truck 100 also comprises at least one lug 9 connected to each rotating plate 33, which is fixed to the corresponding longitudinal extension 101 and 102, extending transversally in the space 12 defined between both longitudinal extensions 101 and 102, said lug 9 preventing the corresponding rotating plate 33 from a vertical movement when the pallet truck is moved with the frame 1 in the rest position Pr. As a result, if, with the frame 1 in said rest position Pr, the movement of the pallet truck 100 is caused due to the fact that the rotating plate 33 cannot move vertically, the possible vibrations of said rotating plate 33 caused by said movement can be prevented, at least to a large extent, thereby preventing, at least to a large extent, the generation of noise due to said vibrations and due to the fact that the design of the frame 1 in the form of an open structure prevents echo, along with the reduction of vibrations/noise that are also reduced by the polymer bearings 4, a pallet truck 100 that is quieter than those known in the prior art is obtained.

In the three embodiments each longitudinal extension 101 and 102 is substantially L-shaped, with a substantially horizontal first section 101a and 102a on which are disposed the goods to be transported, and a second section 101b and 102b that extends substantially perpendicular to said first section 101a and 102a from the end of said first section 101a and 102a opposite to the end on which the wheel 6 is disposed, the control wheel 40 and the transmission means 42 facing the second sections 101b and 102b of the longitudinal extensions 101 and 102, on the side opposite the first sections 101a and 102a of said longitudinal extensions 101 and 102.

In the three embodiments the two arms 10 and 11 are connected to each other by the second sections 101b and 102b of the longitudinal extensions 101 and 102, by means of connecting means that are visible and accessible for their cleaning. Said connecting means comprise a first transverse connecting shaft 21 that connects a longitudinal extension 101 and 102 of an arm 10 and 11 with a longitudinal extension 101 and 102 facing the other arm 10 and 11, approximately at the point of connection between the first section 101a and 102a and the second section 101b and 102b of said longitudinal extensions 101 and 102, and which is connected to said two longitudinal extensions 101 and 102, and a second transverse connecting shaft 22 that connects all the longitudinal extensions 101 and 102 of the two arms 10 and 11 to each other, approximately on the end of the second section 101b and 102b opposite said point of connection between the first section 101a and 102a and said second section 101b and 102b of the longitudinal extensions 101 and 102, and which is connected to all the longitudinal extensions 101 and 102. Said connecting shafts 21 and 22 are visible and accessible from above for their cleaning, thus making it easier to clean the frame 1 of the pallet truck 100, and are substantially cylindrical or tube-shaped and pass through the longitudinal extension 101 and 102 to which they are connected, being connected to both sides of said longitudinal extension 101 and 102 by means of continuous welding. As a result, by means of said welding the generation of unevenness on the surface of the welding is eliminated or reduced to a large extent, thereby eliminating or reducing to a large extent the risk of dirt accumulating on said welding, thus making it easier to clean the frame 1 of the pallet truck 100.

The second sections 102b of the facing longitudinal extensions 102 of the two arms 10 and 11 comprise a greater length than the second section 101b of the two remaining longitudinal extensions 101, are passed through by the second connecting shaft 22, and are connected to each other at their ends opposite to the point of connection with the corresponding first sections 101a and 102a by means of connecting means that are visible and accessible from above for their cleaning, such as a stiffening plate 8 for example. The transmission means 42 is connected to the frame 1 by means of said stiffening plate 8. In the second embodiment the second sections 101b and 102b comprise a greater length than in the first embodiment, for example.

Figure 8:
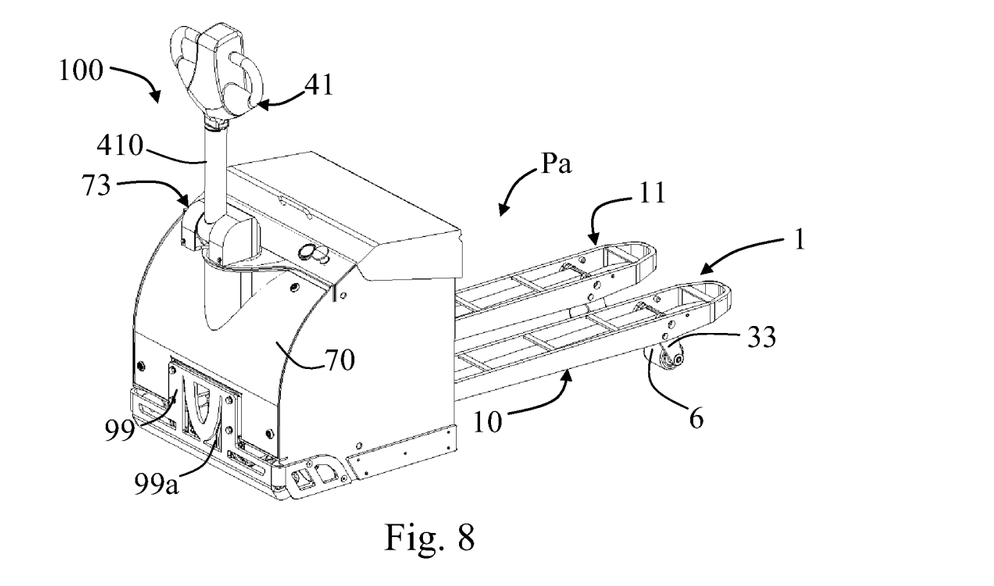
FIG. 8 shows a view in perspective of a third embodiment of the pallet truck of the invention, with a frame of said pallet truck in an active position.
Figure 9:
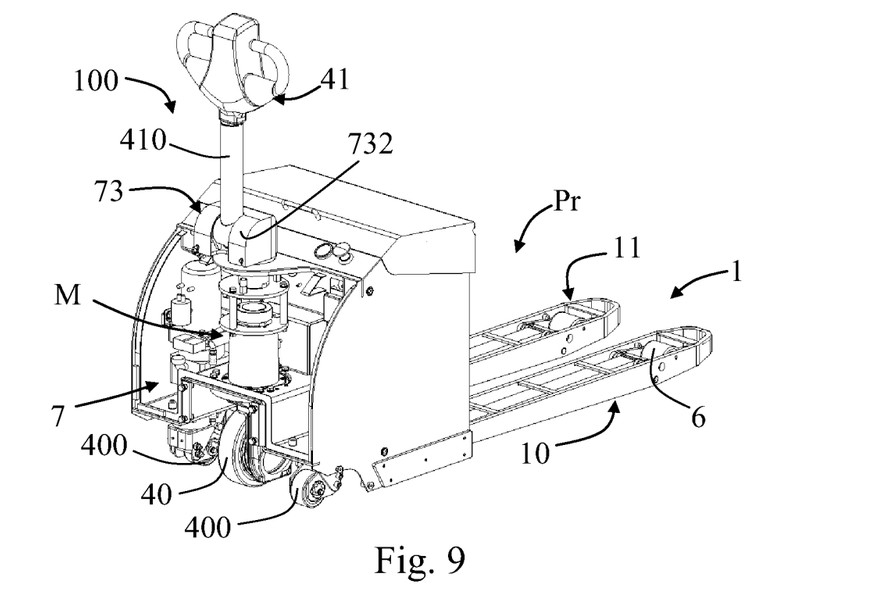
FIG. 9 shows a view in perspective of the pallet truck of FIG. 8 in a rest position, and without a safety cover.

In the third embodiment of the invention shown in FIGS. 8 and 9, the pallet truck 100 is an electrical pallet truck and comprises electrical action means M for moving the pallet truck 100, which comprise a motor, a sealed compartment 7 where said electrical action means M is housed, which is insulated from the outside by means of a cover 70 that is visible and accessible from above for its cleaning, and air-conditioning means for heating or cooling the interior of the sealed compartment 7 and preventing the condensation and/or overheating of said sealed compartment 7. The cover 70 is fixed in a sealed manner to a structure of the pallet truck 100, by means of ring seals or gaskets or equivalent and known elements that provide sealed closures. The sealed compartment 7 is fixed to the frame 1 on one end of the longitudinal extensions 101 and 102 of each arm 10 and 11 of said frame 1, and is disposed on the control wheel 40 and on the sides of said control wheel 40. Said pallet truck 100 also comprises first detection means (not shown in the figures) disposed in the interior of the sealed compartment 7 to detect humidity in said interior, which can be conventional, second detection means (not shown in the figures) disposed in the interior of said sealed compartment 7 to detect the temperature in said interior, which can be conventional, and electronic control means (not shown in the figures), which can be a micro-controller or a micro-processor for example, which determine the humidity and temperature detected by the detection means in the interior of said sealed compartment 7 and which act upon the air-conditioning means in accordance with said determined relative humidity and temperature, to heat or cool the interior of the sealed compartment 7 and prevent condensation and/or overheating inside said sealed compartment 7. The air-conditioning means preferably comprise a Peltier cell (not shown in the figures), which comprises a first cell fixed to the cover 70 inside the sealed compartment 7 and a second cell fixed to said cover 70 outside said sealed compartment 7. Said cells are connected to the cover 70 and ensure the sealed compartment 7 remains sealed, as one cell can be connected to the other without this affecting the seal (for example, the sealed closure is provided by the connection between the cover and the perimeter of the cells, the cells being connected to each other by an internal area in the cells themselves). A description of how a Peltier cell functions is not given as this is already known.

Figure 10:
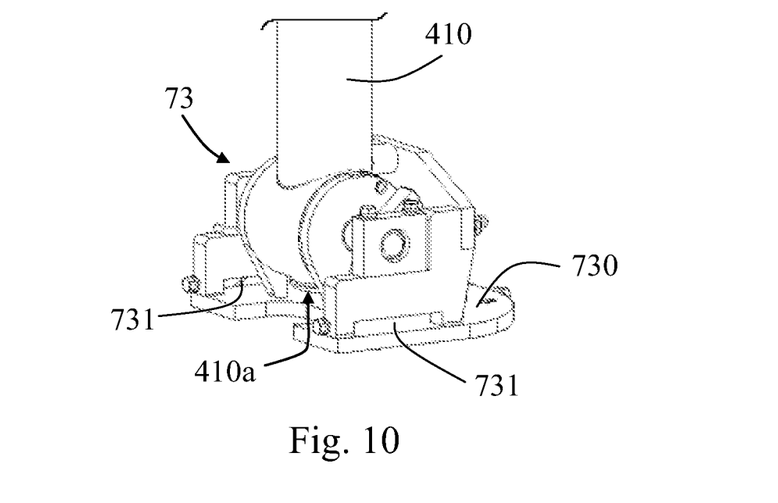
FIG. 10 shows, in perspective, an area of connection of the pallet truck of FIG. 8, without a cover.
Figure 11:
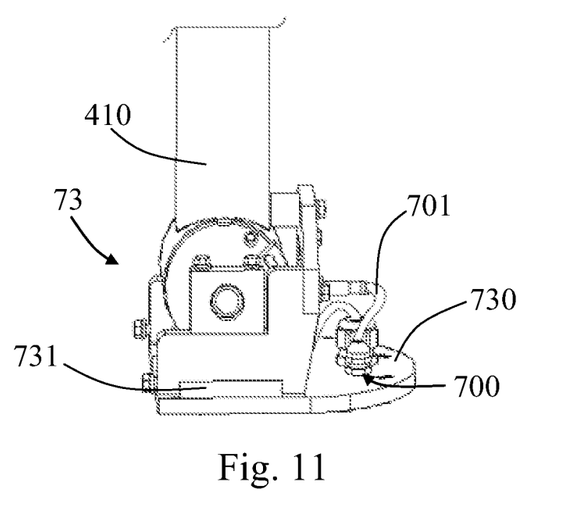
FIG. 11 shows the area of connection of the pallet truck of FIG. 8 laterally, without a cover.

In the third embodiment the control pad 41 comprises a steering member 410 connected with freedom of tilting to the sealed compartment 7 by means of an area of connection 73 shown in FIGS. 10 and 11, which is covered with a lid 732 and which is disposed on the cover 70 of said sealed compartment 7, the steering member 410 comprising a longitudinal hole 410a for housing wiring 701 through to the interior of the area of connection 73, which extends partially in the interior of said area of connection 73, a shaft of the steering member 410 and a rotation shaft of said steering member 410 on the cover 70 being misaligned in relation to each other by a certain distance in order to reduce further the possibility of liquids entering the sealed compartment 7. When the pallet truck 100 is to be cleaned using cleaning liquids, said liquid runs along the steering member 410 along with the wiring 701, and comes out of the hole 410a to the area of connection 73. If said area of connection 73 did not exist, there would be a high risk of said liquid entering the sealed compartment 7 through the wiring 701, so that the sealed nature of said sealed compartment 7 would be reduced, making it a possible source of contamination, in addition to the fact that said entry of liquids would affect the electrical action means M of the pallet truck 100. The wiring 701 must reach the electrical action means M, which requires that it has to be introduced into the sealed compartment 7. To enable this the cover 70 comprises a sealed through-hole 700 through which said wiring 701 originating from the hole 410a of the steering member 410 is introduced into said sealed compartment 7. The sealed through-hole 700 is misaligned in relation to the hole 410a, so that the liquid originating from said hole 410a does not reach the sealed through-hole 700 directly, thereby helping to prevent it from entering the sealed compartment 7. In addition, the area of connection 73 comprises a base 730 disposed on the cover 70, which comprises a sealed through-hole aligned with the sealed through-hole 700 of the cover 70 of the sealed compartment 7, through which the wiring 701 passes, at least one window 731 through which the liquid originating from the hole 410a can be evacuated, said liquid falling on the cover 70, and a slope of at least two degrees to guide said liquid towards said window 731 and thereby enable it to fall on the cover 70, preventing the liquid from reaching the sealed through-hole 700. Thus, in addition to the security provided by the sealed nature of said through-hole (obtained by means of ring seals or other known elements), additional security is provided by the fact that it is difficult for a liquid to reach said sealed through-hole 700, the sealed nature of the sealed compartment 7 not being put at risk, and sources of humidity and contamination being prevented. In said third embodiment, the pallet truck 100 also comprises additional safety devices such as an emergency button, which are connected to the sealed compartment 7, for when the electrical action means M needs to be switched off immediately, to cut off the supply to said electrical action means M in this case, said safety devices complying with code IP67 or higher, which are able to withstand cleaning with abrasive agents for example.

In the third embodiment, the pallet truck 100 of the invention also comprises a safety cover 99 that is disposed at a maximum preset safety distance in relation to the floor, which is approximately 35 millimeters, thereby complying with the applicable legislation. Said safety cover 99 covers the rear part of the control wheel 40, the part opposing the frame 1, and comprises at least one window 99a so that said control wheel 40 can be visible and accessed from the outside for its cleaning. In said third embodiment, the support shaft 30, the lever 31, the additional support shaft 34 and the base 420 are visible and accessible from said window 99a for their cleaning. The safety cover 99 can be fixed, for example, to the structure on which the cover 70 is disposed, by means of screws or other equivalent and known means.

In the third embodiment, the pallet truck 100 of the invention can also comprise an additional wheel 400 on each side of the control wheel 40 to enable the movement of said pallet truck 100, preferably substantially smaller than said control wheel 40. Additionally, in said third embodiment the frame 1 can be equal to that of the first embodiment.

What is claimed is:

1. A pallet truck for transporting goods comprising:
   a substantially horizontal frame on which the goods to be transported are placed and which comprises first and second substantially parallel and longitudinal arms, each of the first and second arms comprising first and second parallel longitudinal extensions that define a space between them, the first and second longitudinal extensions comprising first and second walls, respectively, that face each other and which are visible and accessible through the space, the first and second longitudinal extensions being visible and accessible from above for cleaning;
   a wheel disposed at or near an end of each of the first and second arms and being supported at least in part by polymer bearings, the wheel having first and second opposite sides, the first and second sides connected to the first and second longitudinal extensions, respectively, by respective first and second rotating plates, the wheel having a freedom of rotation and disposed in the space defined by the first and second longitudinal extensions when the frame is in the rest position, the first and second rotating plates each having a first end and a second end being spaced a distance from the respective first and second longitudinal extensions, the first end of the first and second rotating plates being coupled to the wheel, the first and second rotating plates being visible and accessible from above for cleaning; and each of the first and second longitudinal extensions is substantially L-shaped, with a substantially horizontal first section and a second section that extends substantially perpendicular to the first section, the first and second arms being connected to each other by the second sections by a plurality of connecting shafts that are visible and accessible from above, the plurality of connecting shafts comprising a first transverse connecting shaft that connects the first longitudinal extension of the first arm to the first longitudinal extension of the second arm at a location at or near the junction of the first and second sections of the first longitudinal extensions, and a second transverse connecting shaft that connects all of the first and second longitudinal extensions of the first and second arms at a location at or near the end of the second sections of the first and second longitudinal extensions, the first and second transverse connecting shafts being visible and accessible from above for cleaning.

2. The pallet truck according to claim 1, further comprising:
a first transverse support shaft disposed between each of the first and second longitudinal extensions and being visible and accessible from above for cleaning;
a second transverse support shaft disposed below the first transverse support shaft and between each of the first and second longitudinal extensions and being visible and accessible from above for cleaning;
a lever located between each of the longitudinal extensions having first and second ends, the first end operatively coupled to a hydraulic cylinder and the second end coupled to the first transverse support shaft, the hydraulic cylinder adapted to cause a lifting of the frame from a rest position to an active position by the application of a force on the lever that causes the first transverse support shaft to be lifted, the lever being spaced a distance from either the first and second longitudinal extensions, the lever being visible and accessible from above for cleaning; and
a longitudinal member having first and second ends that extends between the first and second longitudinal extensions, the first end coupled to the second transverse support shaft and the second end coupled to the second ends of the first and second rotating plates, the longitudinal member being visible and accessible from above for cleaning.

3. The pallet truck according to claim 2, comprising a safety cover disposed at a distance in relation to the surface on which the pallet truck moves and which covers a part of the control wheel opposite to the part of the control wheel facing the frame, the safety cover comprising at least one window that causes the control wheel to be visible and accessed from the outside for its cleaning.

4. The pallet truck according to claim 1, wherein each arm comprises a plurality of transverse sheets that connect the corresponding first and second longitudinal extensions to each other and to provide rigidity to the arms, the plurality of transverse sheets being visible and accessible for their cleaning.

5. The pallet truck according to claim 1, further comprising at least one lug for each of the first and second rotating plates, each lug being fixed to the corresponding first and second longitudinal extensions and extending in the space defined between the first and second longitudinal extensions, the lug preventing the corresponding first and second rotating plates from a vertical movement when the frame is in the rest position.

6. The pallet truck according to claim 1, wherein the first and second transverse connecting shafts are substantially cylindrical or tube-shaped and pass through the side faces of the respective first and second longitudinal extensions, the first and second transverse connecting shafts connected to the respective side faces of the first and second longitudinal extensions by a continuous weld.

7. The pallet truck according to claim 1, further comprising:
an electrical motor disposed within a sealed compartment that is fixed to the frame and which is insulated from the outside by a cover that is visible and accessible from above for its cleaning; and
an air-conditioner for heating or cooling the interior of the sealed compartment.

8. The pallet truck according to claim 7, further comprising:
a humidity detector disposed in the interior of the sealed compartment to detect the humidity in the interior,
a temperature detector disposed in the interior of the sealed compartment to detect the temperature in the interior, and
an electronic controller coupled to the humidity and temperature detectors that determines the humidity and the temperature detected by the humidity and temperature detectors in the interior of the sealed compartment and which acts on the air-conditioner to control the humidity and temperature within the interior of the seal compartment.

9. The pallet truck according to any of claim 7, further comprising a control pad with a steering member connected with freedom of tilting to the sealed compartment by means of a connection, the connection being disposed on the sealed compartment and at least partially covered by a lid, the steering member comprising an internal elongated through passage that houses a wiring that extends between the control pad and the electrical motor situated within the sealed compartment, the through passage having an end that terminates within an interior of connection, the cover of the seal compartment comprising a first sealed through-hole through which the wiring extends into the interior of the sealed compartment, the first sealed through-hole being misaligned in relation to the end of the through passage.

10. The pallet truck according to claim 9, wherein the connection comprises a base disposed on the cover, the base comprising
a second sealed through-hole aligned with the first sealed through-hole of the cover through which the wiring passes; and
at least one window through which water or other liquids that may originate from the hole can be evacuate away from the cover,
the base comprising a surface having a slope of at least two degrees to guide the water or other liquids towards the at least one window.

11. A pallet truck for transporting goods comprising:
a substantially horizontal frame on which the goods to be transported are placed and which comprises first and second substantially parallel and longitudinal arms, each of the first and second arms comprising first and second parallel longitudinal extensions that define a space between them, the first and second longitudinal extensions comprising first and second walls, respectively, that face each other and which are visible and accessible through the space, the first and second longitudinal extensions being visible and accessible from above for cleaning;
a first transverse support shaft disposed between each of the first and second longitudinal extensions and being visible and accessible from above for cleaning;
a second transverse support shaft disposed below the first transverse support shaft and between each of the first and second longitudinal extensions and being visible and accessible from above for cleaning;
a base coupled to a control wheel;
a hydraulic cylinder supported at least in part by the base;
a lever located between each of the longitudinal extensions having first and second ends, the first end operatively coupled to the hydraulic cylinder and the second end coupled to the first transverse support shaft, the hydraulic cylinder adapted to cause a lifting of the frame from a rest position to an active position by the application of a force on the lever that causes the first transverse support shaft to be lifted, the lever being spaced a distance of at least 6 millimeters from either the first and second longitudinal extensions, the lever being visible and accessible from above for cleaning;
a wheel disposed at or near an end of each of the first and second arms, the wheel having first and second opposite sides, the first and second sides connected to the first and second longitudinal extensions, respectively, by respective first and second rotating plates, the wheel having a freedom of rotation and disposed in the space defined by the first and second longitudinal extensions when the frame is in the rest position, the first and second rotating plates each having a first end and a second end, the first end coupled to the wheel; and
a longitudinal sheet having first and second ends that extends between the first and second longitudinal extensions, the first end coupled to the second transverse support shaft and the second end coupled to the second ends of the first and second rotating plates, each of the first and second rotating plates being spaced a distance from the respective first and second longitudinal extensions, the first and second rotating plates and the longitudinal sheet being visible and accessible from above for cleaning;
wherein each of the first and second longitudinal extensions is substantially L-shaped, with a substantially horizontal first section and a second section that extends substantially perpendicular to the first section, the first and second arms being connected to each other by the second sections by one or more connecting shafts that are visible and accessible from above;
wherein the connecting shafts comprise a first transverse connecting shaft that connects the first longitudinal extension of the first arm to the first longitudinal extension of the second arm at a location at or near the junction of the first and second sections of the first longitudinal extensions, and a second transverse connecting shaft that connects all of the first and second longitudinal extensions of the first and second arms at a location at or near the end of the second sections of the first and second longitudinal extensions, the first and second transverse connecting shafts being visible and accessible from above for cleaning;
wherein the first and second transverse connecting shafts are substantially cylindrical or tube-shaped and pass through the side faces of the respective first and second longitudinal extensions, the first and second transverse connecting shafts connected to the respective side faces of the first and second longitudinal extensions by a continuous weld.

12. The pallet truck according to claim 11, wherein each arm comprises a plurality of transverse sheets that connect the corresponding first and second longitudinal extensions to each other and to provide rigidity to the arms, the plurality of transverse sheets being visible and accessible for their cleaning.

13. The pallet truck according to claim 11, further comprising at least one lug for each of the first and second rotating plate, each lug being fixed to the corresponding first and second longitudinal extensions and extending in the space defined between the first and second longitudinal extensions, the lug restricting the corresponding rotating plate to a vertical movement when the frame is in the rest position.

14. The pallet truck according to claim 11, further comprising:
an electrical motor disposed within a sealed compartment that is fixed to the frame and which is insulated from the outside by a cover that is visible and accessible from above for its cleaning; and
an air-conditioner for heating or cooling the interior of the sealed compartment.

15. The pallet truck according to claim 14, further comprising:
a humidity detector disposed in the interior of the sealed compartment to detect the humidity in the interior,
a temperature detector disposed in the interior of the sealed compartment to detect the temperature in the interior, and
an electronic controller coupled to the humidity and temperature detectors that determines the humidity and the temperature detected by the humidity and temperature detectors in the interior of the sealed compartment and which acts on the air-conditioner to control the humidity and temperature within the interior of the seal compartment.

16. The pallet truck according to any of claim 14, further comprising a control pad with a steering member connected with freedom of tilting to the sealed compartment by means of a connection, the connection being disposed on the sealed compartment and at least partially covered by a lid, the steering member comprising an internal elongated through passage that houses a wiring that extends between the control pad and the electrical motor situated within the sealed compartment, the through passage having an end that terminates within an interior of connection, the cover of the seal compartment comprising a first sealed through-hole through which the wiring extends into the interior of the sealed compartment, the first sealed through-hole being misaligned in relation to the end of the through passage.

17. The pallet truck according to claim 16, wherein the connection comprises a base disposed on the cover, the base comprising
a second sealed through-hole aligned with the first sealed through-hole of the cover through which the wiring passes; and at least one window through which water or other liquids that may originate from the hole can be evacuate away from the cover, the base comprising a surface having a slope of at least two degrees to guide the water or other liquids towards the at least one window.

18. The pallet truck according to claim 11, comprising a safety cover disposed at a distance in relation to the surface on which the pallet truck moves and which covers a part of the control wheel opposite to the part of the control wheel facing the frame, the safety cover comprising at least one window that causes the control wheel to be visible and accessed from the outside for its cleaning.

* * * * *